3,267,463
COMPENSATOR FOR VARIATION IN RADAR TARGET REFLECTIVITY DUE TO RANGE CHANGES
Irwin D. Olin, Silver Spring, Md., assignor to the United States of America as represented by the Secretary of the Navy
Filed May 14, 1964, Ser. No. 367,601
3 Claims. (Cl. 343—7)

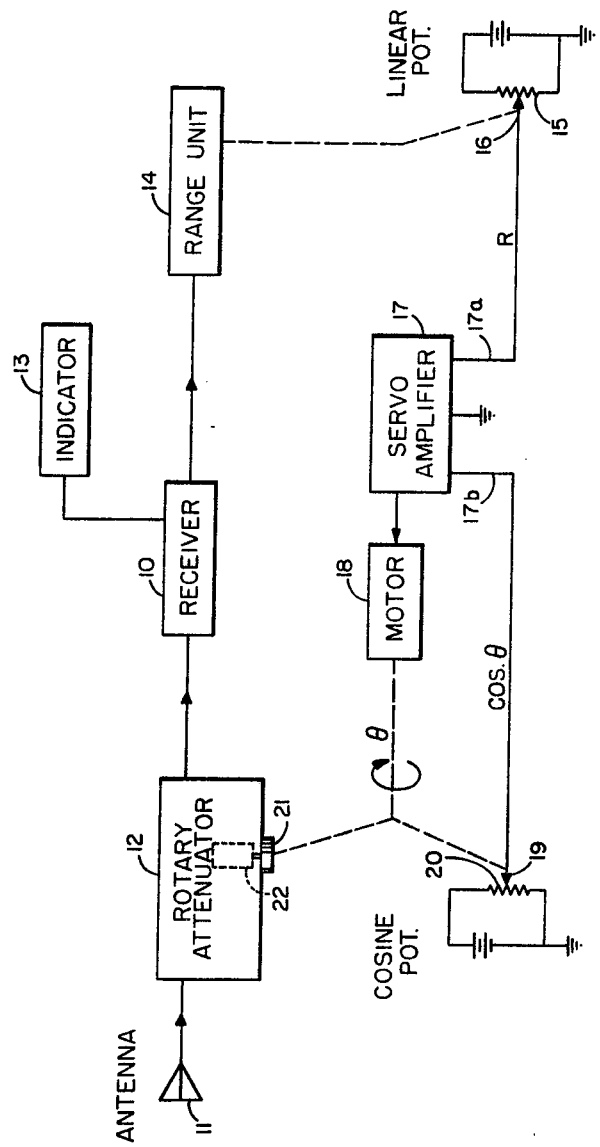

The invention described herein may be manufactured and used by or for the Government of the United States of America for governmental purposes without the payment of any royalties thereon or therefor.

This invention relates to an automatic attenuation system and in particular to an attenuation system for a radar set wherein the signal from the antenna is automatically attenuated in correlation with the range of the target.

Many previous radar sets present little or no information concerning the effective target size. Recently, however, considerable effort has been expended in the development of radar systems which present to the operator an indication of the size and shape of the target. To obtain such an indication, the received signal must be attenuated to compensate for the variation in the strength of the signal which accompanies a variation in target range. The components and circuitry whereby such compensatory attenuation has been previously accomplished are relatively complex and expensive. This invention provides a relatively simple circuit wherein relatively inexpensive components cooperate to attenuate the received signal in correlation to the range of the target.

An object of the invention, therefore, is the provision of a system which attenuates a signal in correlation to a variable condition.

Another object of the present invention is to provide a circuit which is suitable for use in a radar set for attenuating the signals received from a target in accordance with the range of the target.

A still further object of the invention is to provide means in a radar set which attenuate the signals reflected by the target in such a manner that the attenuated signal is substantially free from variations due to varying target range.

The exact nature of this invention, as well as other objects and advantages thereof, will be readily apparent from consideration of the following specification relating to the annexed drawing in which an embodiment of the invention is illustrated in the form of a block diagram.

This invention is concerned primarily, but not exclusively, with radar systems which are used to classify, identify and otherwise describe the nature of the target. In this increasingly important problem area, the radar set is utilized not only to provide the conventional data relating to target direction, range, velocity, acceleration, etc., but also information relating to the size and, more desirably, the shape of the target. To obtain such information it is essential that all factors, other than the target itself, which affect the strength of the signal reflected from the target, be compensated for. The range of the target is obviously a factor requiring such compensation. It is of interest to note that, in general, radar sets not designed to identify the nature of the target, include an automatic gain control (AGC) which amplifies a signal reflected by a target to a desired strength level, thereby removing not only the signal strength variation due to range but also the variation due to the nature of the target.

It is well known that the strength of a field radiating uniformly from a source varies inversely as the square of the distance from the source. In the idealized radar situation, the reflected signal received by the antenna is related to the inverse fourth power of the target range since the reflecting target must also be considered a source. Although some departure from the idealized case must be expected because of the non-uniform radiation pattern both of the transmitting antenna and of the target, the idealized relation of the inverse fourth power of target range to signal strength has been found to provide a good approximation of the relation between signal strength and target range encountered in actual operation.

Referring now to the drawing, the receiver 10 is connected to the antenna 11 through a rotary attenuator 12. The receiver 10 is also connected to the indicator 13 and to the range unit 14 which includes linear potentiometer 15. The wiper 16 of potentiometer 15 is connected to one input 17a of differential servo amplifier 17 which is in turn connected to servo motor 18. Wiper 19 of cosine potentiometer 20 is connected to the other input 17b of the servo amplifier 17. The servo motor 18 is mechanically coupled to position both the wiper 19 of cosine potentiometer 20 and the rotary adjustment 21 and interior vane 22 of attenuator 12.

Wiper 16 of linear potentiometer 15 is controlled by range unit 14, in a manner well known in the radar art, to provide at servo amplifier input 17a a potential related to the range R of the target. The potential at input 17b is maintained equal to that at input 17a by the conventional cooperative functioning of differential servo amplifier 17 and motor 18. Physically the electrical potential equivalence of inputs 17a and 17b requires that the angular position $\theta$ of the shaft of motor 18 is such that the cosine $\theta$ is proportional to R. It will also be apparent that the angular adjustment 21 of rotary attenuator 12 will also be equal to $\theta$.

Rotary attenuator 12 is one of the commercially available rotary vane attenuators which are characterized by the unique transfer function which provides that for a constant power input, the output power of the attenuator varies as the fourth power of the cosine of the angular position of the rotary adjustment 21, which is, of course, mechanically connected to an internal rotary vane 22 which provides the actual attenuation of the microwave signals proceeding from antenna 11 to receiver 10. The operational characteristic of attenuator 12 may be expressed in equation form as $$P_{out} = P_{in} \cos^4 \theta \qquad (1)$$

To provide a clearer explanation of the operation of the invention, let it be assumed that the radar is locked on to a target proceeding in a direction to increase range. The increasing range will cause the signal level at antenna 11 to decrease and the signal level at input 17a to increase. The servo system will position wiper 19 to cause the input 17b to correspondingly increase, it is being noted that increasing potential at 17b is accompanied by a decrease in angle $\theta$. As angle $\theta$ decreases, the signal reduction in attenuator 12 is decreased, thereby substantially maintaining the signal transferred to the receiver unit 10 free of variation due to the changing range.

The described relationships can be summarized mathematically as follows: because of the equality of the amplifier inputs 17a and 17b $$R = K \cos \theta \qquad (2)$$

Since, for a given target, the reflected signal received by the antenna 11, and hence the input to attenuator 12, is related to the inverse fourth power of the range, the input $P_{in}$ to attenuator 12 may be expressed as $$P_{in} = K'/R^4 \qquad (3)$$

Because of the relationships in Equations 2 and 3, the operational equation, Equation 1, for the attenuator 12 may be rewritten as $$P_{out} = K'/R^4 \cos^4 \theta = K'' \qquad (4)$$

where K, K' and K'' are constants.

It can be seen from Equations 2, 3 and 4 that, because of the unique attenuation provided by rotary attenuator 12, the reflected signal, which when received by antenna 11 is inversely dependent upon the fourth power of the target range, is received by receiver 10, for display by indicator 13, in a form independent of target range.

It will also be apparent that there has been disclosed a simple circuit, composed of conventional components, which is suitable for use in a target identification radar set, for attenuating the reflected signals from a target in such a manner that the attenuated signals are substantially free from variations due to varying target range.

The foregoing disclosure relates only to an embodiment of the invention and it should be understood that numerous modifications or alterations may be made therein without departing from the spirit and the scope of the invention as set forth in the appended claims.

What is claimed is:

1. In a radar receive system, the combination comprising:
    means for sensing a condition and producing an electrical output potential proportional to the condition sensed;
    an adjustable attenuator connected to said sensing means;
    a receiver, range unit means, and a potentiometer connected in series to said attenuator;
    an adjustable vane mounted in said attenuator; and
    a servo means mechanically and electrically connected to said potentiometer and said vane means whereby the output of said range unit means varies the input of the servo so as to provide variable attenuation to the signals sensed.

2. In a radar receive system, an apparatus for automatically attenuating the signal received comprising:
    an adjustable attenuator connected to transfer and attenuate the signal received, said attenuator including an adjustable vane and having the characteristic that the signal is attenuated according to the fourth power of cosine $\theta$, where $\theta$ is the adjusted angle of said vane;
    receive means connected to said adjustable attenuator;
    a range unit connected to said receiver means;
    a first wiper unit connected mechanically to said range unit, said wiper varying in accordance with the range unit;
    a servo amplifier electrically connected to said first wiper unit;
    a servo motor electrically connected to said servo amplifier, said servo motor being mechanically connected to said vane in said attenuator for angular movement therebetween; and
    a second wiper means mechanically connected to said servo motor and electrically connected to said servo amplifier so that the potential caused by the signal received and the potential at said second wiper means tend to become equal at all times, thereby providing variable attenuation of the signal sensed.

3. A method for automatically attenuating a radar signal received comprising the steps of:
    receiving a radar signal reflected from a target;
    transferring said signal to a receiver through an attenuator having an adjustable vane and such characteristics as to attenuate in proportion to the fourth power of cosine $\theta$, where $\theta$ is the adjusted angle of a vane in said attenuator;
    developing a first electrical potential proportional to the target range;
    developing a second electrical potential proportional to cosine $\theta$; and
    equalizing said first and second electrical potentials by varying the angle $\theta$ whereby the signal transferred to said receiver from the output of said attenuator is substantially free from variation due to target range thus providing variable attenuation.

References Cited by the Examiner

UNITED STATES PATENTS 2,474,875 7/1949 White _____ 343—13

FOREIGN PATENTS 798,060 7/1958 Great Britain.

CHESTER L. JUSTUS, *Primary Examiner.*

T. H. TUBBESING, *Assistant Examiner.*